Patented May 12, 1925.

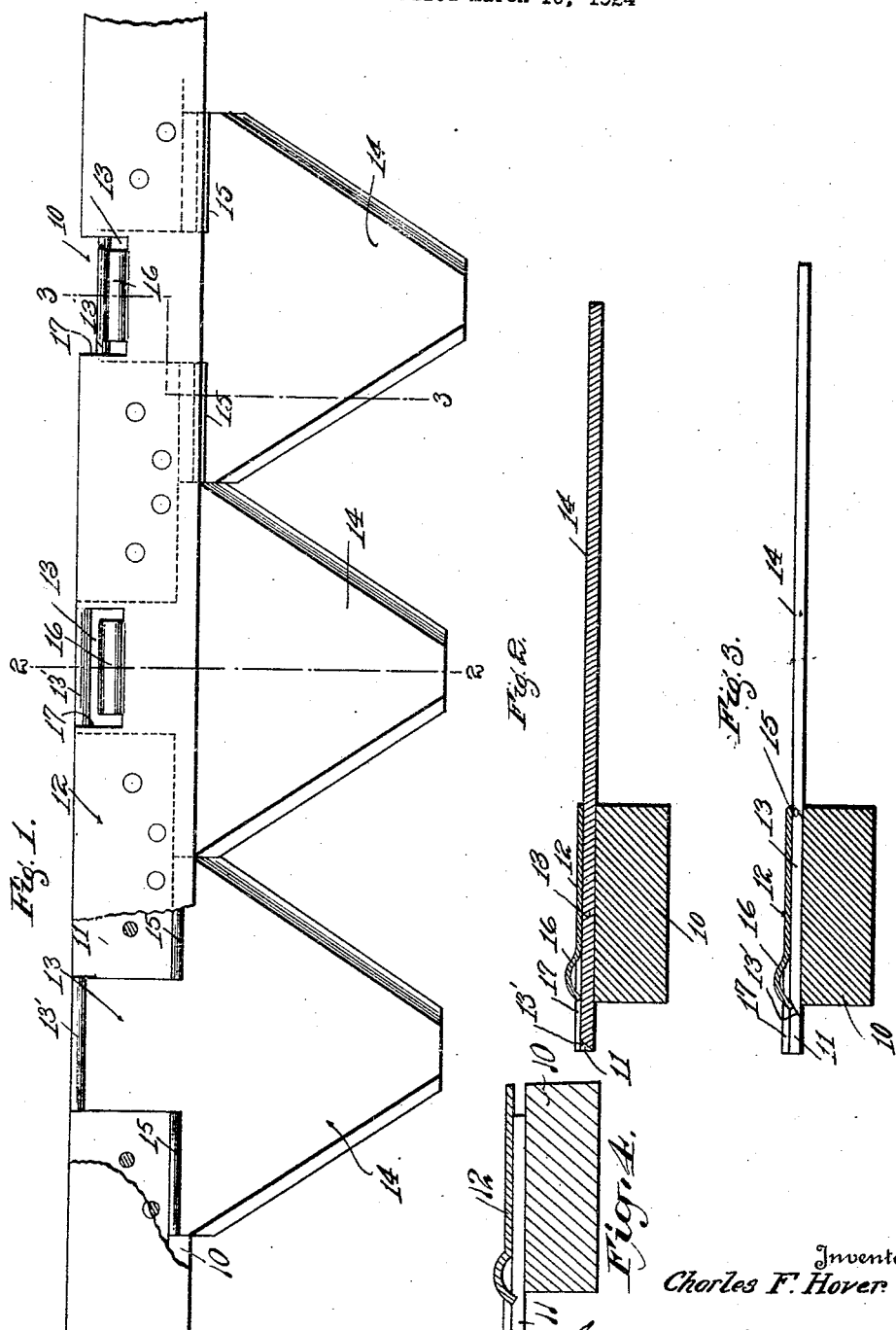

1,537,354

UNITED STATES PATENT OFFICE.

CHARLES F. HOVER, OF CONRAD, MONTANA.

SICKLE BAR.

Application filed March 10, 1924. Serial No. 698,302.

*To all whom it may concern:*

Be it known that I, CHARLES F. HOVER, a citizen of the United States, residing at Conrad, in the county of Pondera, State of Montana, have invented certain new and useful Improvements in Sickle Bars; and I do hereby declare the following to be a full, clear, and exact description of the invention, such as will enable others skilled in the art to which it appertains to make and use the same.

This invention relates to new and useful improvements in sickle bars, and particularly to sickle bars used on mowers, binders, headers, and like harvesting machines.

In practically all of the sickles now in use on these classes of agricultural machines, the cutter blades are riveted to the sickle bars, and when a blade breaks, it is necessary to perform the laborious operation of removing the rivets, and reriveting a new blade in place. Sometimes it is necessary to stop work while the sickle is taken to a blacksmith shop, for repairs or for sharpening. A blade and sickle bar so constructed that the blade may be easily and quickly inserted or removed, without the aid of any rivets, bolts or like fastening devices, is something which is greatly needed in the farming districts of the country. The subject-matter of the present application resides in the provision of a sickle bar and removable blades thereby overcoming this riveting difficulty, the blades being held in the bar by friction solely.

Other objects and advantages will be apparent from the following description when taken in connection with the accompanying drawing.

In the drawing:

Figure 1 is a top plan view of a portion of a sickle bar, with a number of blades attached, showing the invention.

Figure 2 is a transverse sectional view on the line 2—2 of Figure 1, the blade being properly seated in the sickle bar.

Figure 3 is a transverse sectional view on the staggered line 3—3, of Figure 1, showing the blade partly inserted in the sickle bar. Figure 4 is a section on line 2—2 of Figure 1, blade 14 being removed.

Referring particularly to the accompanying drawing, 10 represents a portion of a sickle bar on the upper face of which are secured the series of regularly spaced and longitudinally extending strips 11, the rear edge portion of each of which projects beyond the rear edge of the sickle bar, while the other or forward edge portion is spaced inwardly, and in parallel relation to the forward edge of the sickle bar. Secured to the upper faces of the strips 11, and extending throughout the length thereof, is a somewhat thinner metal strip 12, said strip being of greater width than the strips 11, with its rear edge in the plane of the rear edges of the said strips 11, but with its forward edge in the plane of the front edge of the sickle bar 10, whereby said forward portion of the strip or plate 12 projects beyond the forward edges of the strips 11 to a short distance, which has been found in practice to be approximately one quarter of an inch. The strips 11 are so spaced apart as to provide openings or pockets of sufficient width to receive snugly therein the stem portions 13 of the cutter blades 14. The body portion of each blade is of the usual shape, with the shoulders 15, but it will be noted that the upper portions of these shoulders are beveled, and that said shouldered portions are, when the blade is properly seated beneath the plate 12, approximately one quarter of an inch thereunder. The strips 11 are of a thickness less than the thickness of the stem 13 of the cutter blade 14, but to a very small degree, whereby, when the beveled shoulders 15 engage with the forward edge of the plate 12, and a blow given to the front end of the blade, this plate will be flexed upwardly to permit the blade to pass therebeneath, said plate frictionally engaging with the upper face of the cutter blade. When properly driven in, the shoulders of the blade rest against the forward edge face of the strip 11, while the rear end face of the stem 13 lies in the plane of the rear edges of the plate and strip.

Projecting from the rear edge portion of the plate 12, at points directly over the spaces between the sections of the strip 11, are the spring tongues 16, said tongues being slightly shorter than the depth of the recesses 17, within which the tongues are disposed and being arched upwardly, as clearly seen in the sectional view Fig. 2, so that its free end is arranged at an angle to the face of the stem 13, and whereby the sharp angle thereof will bite into the said face of the stem. It will also be noted that the width of the recess 17 is slightly less than the width of the stem 13, so that the portion at each side of the recess overlies the stem for a sufficient distance to preclude any rocking movement of the cutter blade, in either direction.

The blade may be inserted, by hand, until the beveled end 13', of the stem 13, engages with the free edge of the tongue 16, after which the blow of a hammer, or like instrument, is necessary against the outer end of the blade to drive same into its seated position. As the beveled end of the stem engages beneath the tongue 16, the tongue is flexed upwardly, whereupon the sharp edge of the tongue immediately bites into the upper face of the stem. At the same time, the beveled shoulders of the blade engage with the lower face of the forward edge of the plate 12, causing same to be flexed upwardly to permit the passage of the adjacent portion of the blade therebeneath. This edge of the plate 12 immediately returns into frictional engagement with the upper face of the blade to firmly grip same.

As the shoulders 15 rest tightly against the forward edge faces of the strip sections 11, and the stem 13 fits snugly between the adjacent ends of the sections, there will be no appreciable lateral play, or loose movement of the blade. Furthermore, the adjacent blades, at each side of the blade, bear against the sides thereof, to further insure against lateral play.

Should the tongue 16 not bear tightly enough against the stem 13, it is only necessary to remove the blade, and strike the tongue, from above, to bend same in the direction of the sickle bar, to reduce the space between the free end of the tongue and the upper face of the bar. Similarly, the forward edge of the plate 12 may be bent downwardly, with a hammer, or like tool, to increase the friction between the plate and the shouldered portion of the cutter blade.

From the foregoing it will be seen that I have provided a sickle bar which is simple in construction, strong and durable in operation, and one wherein the use of rivets, or like fastenings is obviated, thus permitting the easy and quick application or removal of a blade. A single blow on the rear end of the stem 13 releases the blade sufficiently to permit easy withdrawal with the hand. The time required to replace a damaged blade, while in the field, is insignificant when compared with the usual practice of removing rivets, and attaching the new blade by other rivets.

What is claimed is:

1. In a cutting mechanism, a sickle bar having a pocket, a blade having a stem seated in the pocket, and flexible means on the bar frictionally engaged with the stem.

2. In a cutting mechanism, a sickle bar having a pocket, a blade having a stem seated in the pocket, resilient means carried by the bar and frictionally engaging with the stem for retaining the stem in the pocket, said resilient means engaging with the body of the blade.

3. In a cutting mechanism, a sickle bar having a pocket, a blade having a stem seated in the pocket, and a resilient plate covering the pocket and having one portion engaged frictionally with the stem of the blade.

4. In a cutting mechanism, a sickle bar having a pocket, a blade having a stem seated in the pocket, and a resilient plate covering the pocket and stem and having one portion frictionally engaging the body of the blade and another portion frictionally engaging the stem of the blade.

5. In a cutting mechanism, a sickle bar having a pocket, a blade having a stem seated in the pocket, and a resilient plate covering the pocket and said stem and having a resilient tongue frictionally engaged with said stem.

6. In a cutting mechanism, a sickle bar having a pocket, a blade having a stem seated in the pocket, a resilient plate covering the pocket, said plate having a recess, and a spring tongue in the recess frictionally engaged with the stem.

7. In a cutting mechanism, a sickle bar having a pocket, a blade having a stem seated in the pocket, and a resilient plate covering the pocket, said plate having a spring tongue on one edge portion frictionally engaged with the stem, said plate having another edge portion frictionally engaged with the body of the blade.

8. In a cutting mechanism, a sickle bar having a pocket, a blade having a stem seated in the pocket, a resilient plate covering the pocket, the free end of the stem being beveled, a spring tongue on the plate adapted to be engaged and flexed into frictional engagement with the stem by the beveled end of said stem, and beveled shoulders on the blade arranged to flex one edge portion of the plate into frictional engagement with the body of the plate.

9. In a cutting mechanism, a sickle bar, spaced strips on the bar, a resilient plate secured to said strips and in covering relation to the space therebetween, said plate projecting beyond one edge of the strips, a spring tongue formed on the other edge of the resilient plate and projecting into the said space, and a removable blade having a stem seated in said space and frictionally retained by said tongue, said blade having shoulders frictionally retained by and beneath the projecting edge portion of said plate.

In testimony whereof, I affix my signature.

CHARLES F. HOVER.